United States Patent
Coombs

(10) Patent No.: US 11,162,589 B2
(45) Date of Patent: Nov. 2, 2021

(54) EXCLUSION AND PULSATION SEAL FOR HYDRAULIC FRACTURING PUMP

(71) Applicant: Parker-Hannifin Corporation, Cleveland, OH (US)

(72) Inventor: Evan J. Coombs, Sandy City, UT (US)

(73) Assignee: Parker-Hannifin Corporation, Cleveland, OH (US)

( * ) Notice: Subject to any disclaimer, the term of this patent is extended or adjusted under 35 U.S.C. 154(b) by 141 days.

(21) Appl. No.: 16/585,068

(22) Filed: Sep. 27, 2019

(65) Prior Publication Data

US 2020/0132195 A1 Apr. 30, 2020

Related U.S. Application Data

(60) Provisional application No. 62/750,867, filed on Oct. 26, 2018.

(51) Int. Cl.
*F16J 15/3232* (2016.01)
*F04C 15/00* (2006.01)
*E21B 43/26* (2006.01)

(52) U.S. Cl.
CPC ....... *F16J 15/3232* (2013.01); *F04C 15/0015* (2013.01); *E21B 43/26* (2013.01)

(58) Field of Classification Search
CPC .......... F16J 15/00; F16J 15/32; F16J 15/3204; F16J 15/3232; F16J 15/3236; F04C 15/00; F04C 15/0003; F04C 15/0007; F04C 15/0015; E21B 43/26
USPC ....................................................... 277/549
See application file for complete search history.

(56) References Cited

U.S. PATENT DOCUMENTS

| | | | | |
|---|---|---|---|---|
| 2,888,281 A * | 5/1959 | Ratti | ....... | F16J 15/164 277/366 |
| 3,052,478 A * | 9/1962 | Horvereid | ....... | F16J 15/32 277/394 |
| 7,959,159 B2 * | 6/2011 | Hocker | ....... | F02M 59/442 277/559 |
| 9,670,923 B2 * | 6/2017 | Weaver | ....... | F16J 15/186 |
| 2004/0164496 A1 * | 8/2004 | Okada | ....... | F02M 59/442 277/549 |
| 2016/0131131 A1 * | 5/2016 | Weaver | ....... | F04B 1/0408 277/300 |
| 2017/0261106 A1 * | 9/2017 | Hocker | ....... | F16J 15/32 |

* cited by examiner

*Primary Examiner* — Nathan Cumar
(74) *Attorney, Agent, or Firm* — Renner, Otto, Boisseile & Sklar, LLP

(57) ABSTRACT

An annular seal, such as for use in a fracking pump, that is designed to exclude debris from entering the sealing gland, and is designed to enhance seal stability and extrusion resistance during high-pressure pulsation events. The seal includes a heel side configured to fit within an annular groove of a first component, a sealing side opposite the heel side that is configured to seal against a second component, and opposite leading and trailing sides that are radially interposed between the sealing and heel sides. The heel side may have a flat heel surface in transverse cross-section. The sealing side may have a concave portion that is configured to open toward and face the second component. The leading side is configured to face toward upstream fluid, and may have a flat leading surface in transverse cross-section that is oriented perpendicularly to a longitudinal axis of the seal.

20 Claims, 12 Drawing Sheets

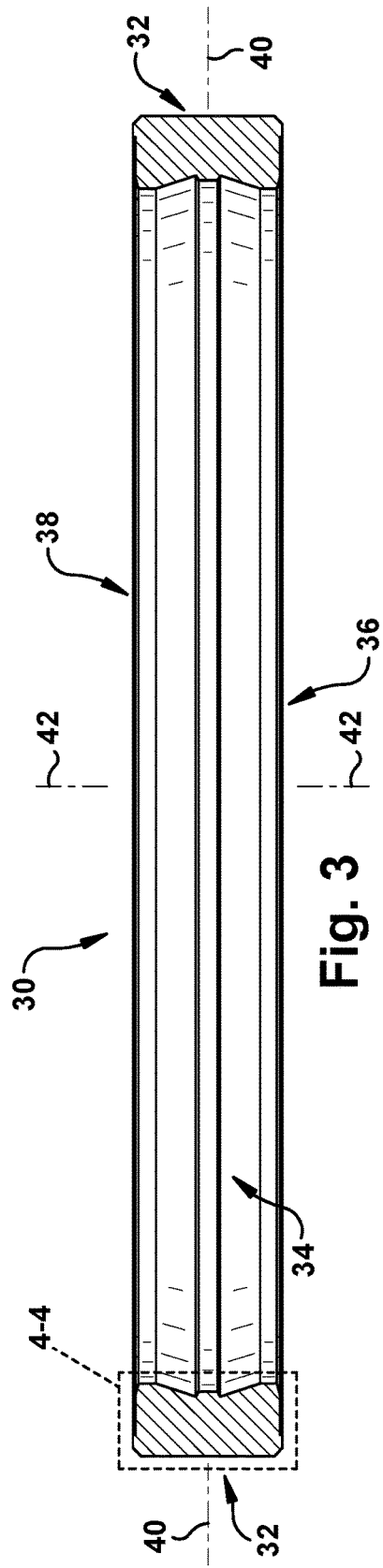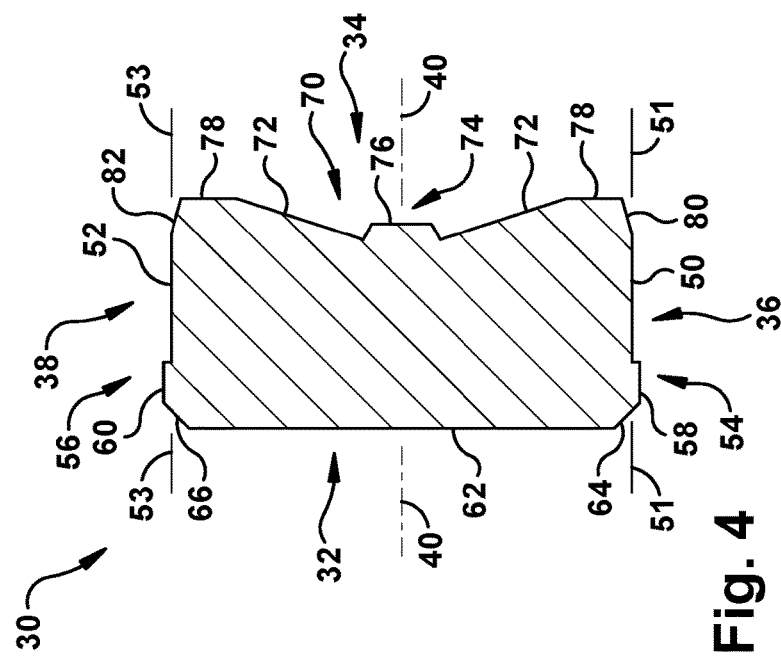
Fig. 3
Fig. 4

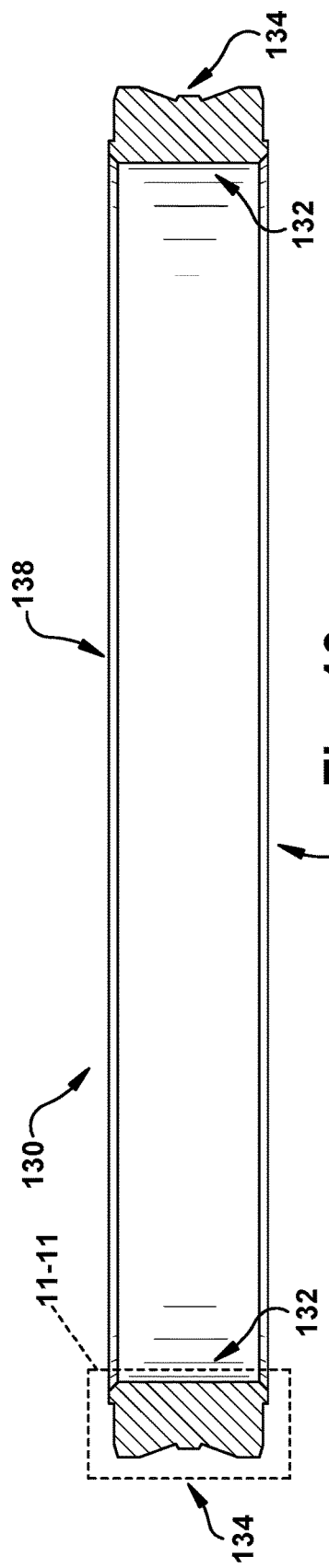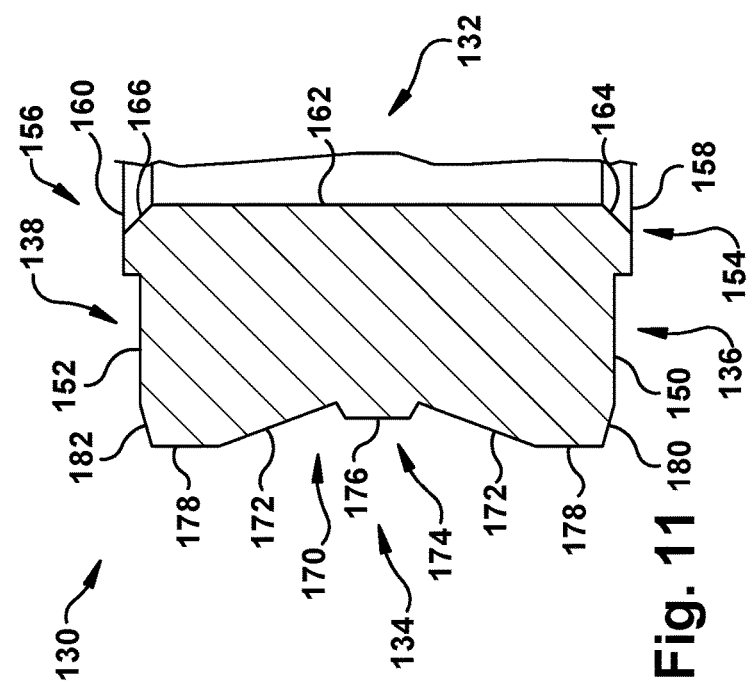
Fig. 10
Fig. 11

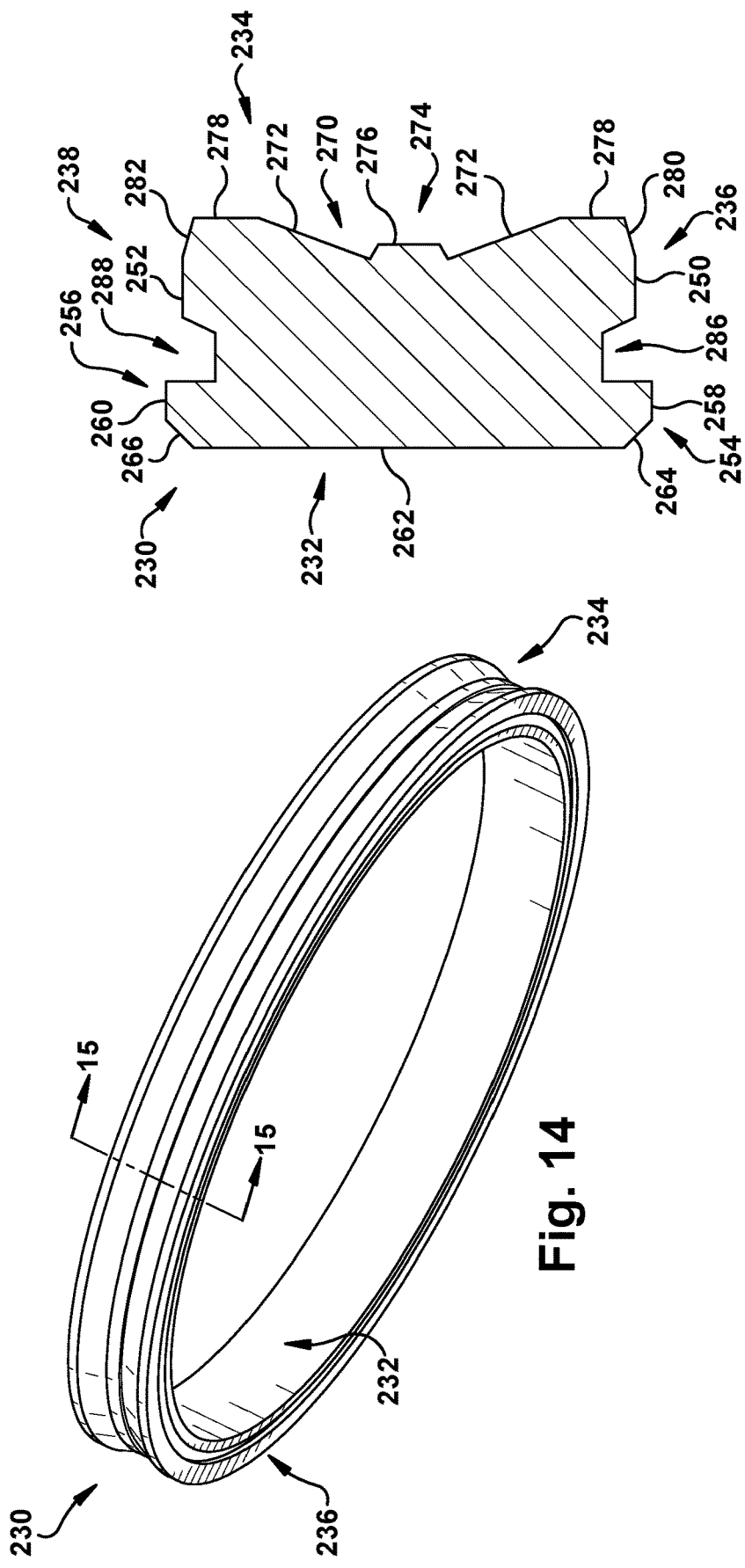

EXCLUSION AND PULSATION SEAL FOR HYDRAULIC FRACTURING PUMP

RELATED APPLICATIONS

This application claims the benefit of U.S. Provisional Application No. 62/750,867 filed Oct. 26, 2018, which is hereby incorporated herein by reference.

TECHNICAL FIELD

The present disclosure relates generally to a seal, and more particularly to an exclusion and pulsation seal, such as for use in suction and/or discharge covers for hydraulic fracturing pumps.

BACKGROUND

Hydraulic fracturing, or fracking, is a technique used to recover gas and oil from subsurface rock, such as shale. The fracking process typically involves drilling down into the earth and then injecting a high-pressure fracking fluid into the rock to release the gas trapped within the rock. The high-pressure fracking fluid injected into the wellbore generally contains fracture sand, chemicals, mud and/or cement. These chemicals are used to accelerate the formation of cracks, and the small grains of sand or other proppant are used to hold the cracks open when hydraulic pressure is removed. The fracking process can be carried out vertically or, more commonly, by drilling horizontally to the rock layer to create pathways to release the gas.

High-pressure pumping systems are commonly used to propel the fracking fluid into the wellbore. Such pumping systems typically use a high-pressure reciprocating plunger pump, which includes a power end and fluid end. The power end converts the rotation of a drive shaft to reciprocating motion of a plurality of plungers. The reciprocating motion of the plungers, in association with the operation of valves within the fluid end, produces a pumping process due to the volume evolution within the fluid end. Typically, the fluid end includes a pump housing, valves and valve seats, plungers, seal packings, springs and retainers. The pump housing has a suction valve in a suction bore, a discharge valve in a discharge bore, and a plunger in a plunger bore. In the suction stroke, the plunger retracts along the plunger bore and causes a quick decrease of the inner pressure; thus, the suction valve is opened and the fluid is pumped in due to the pressure difference between the suction pipe and the inner chamber. In the forward stroke, the hydraulic pressure gradually increases until the pressure is large enough to open the discharge valve and thus pump the compressed liquid through the discharge pipe.

To provide access to each of the discharge bore and the suction bore, the housing usually includes corresponding access bores having external access ports that are fluidly sealed with corresponding discharge covers and suction covers. To provide suitable sealing functionality between the housing and the respective suction and discharge covers, an annular seal is provided between these components. However, seals that are currently used in such systems are known to deform during rapid system pressure events, thereby allowing fracking fluid debris into the sealing gland area. During subsequent rapid pressure events this fracking debris rubs between the seal and the metal components. This causes removal of the metal sealing gland area, and also causes rapid wear of the seal, which may result in failure of the seal due to the reduction in sealing force. In this condition, the replacement of the worn seal with a new seal does not restore sealing functionality of the system due to the increased gland cross sectional area and reduced sealing force. Instead, the metal sealing areas usually must be repaired or replaced.

Such breakdown of high-pressure fracking pumps can cause significant problems in the oilfield. The downtime for replacement or maintenance of fluid ends at the fracturing site costs the oil service large sums of money in downtime and repair. In addition, the users need to have significant amounts of backup pumping equipment to ensure continuous operation, which is counter to the current emphasis on shrinking the oilfield footprint. Therefore, there is a need to improve the durability and functionality of the seals used in these high-pressure fracking pumps to enhance the overall reliability and usability of the pump.

SUMMARY

The present disclosure provides an annular seal, such as for use in a fracking pump, in which the seal is designed to exclude fracking debris from entering the sealing gland, and also is designed to enhance seal stability and extrusion resistance during rapid system pressure pulsation events.

More particularly, the seal is configured with a specific geometry that enables the seal to deform when in use to provide an exclusion lip that prevents contamination from entering the sealing gland. For example, when fully installed and in use, the seal may provide a sharp sealing lip lead-in feature, in which this sealing lip may have an essentially 90-degree surface relative to the fluid stream to exclude contamination into the gland. Additionally, the seal may be self-energized when installed and in use, such that the seal is designed to deform to fill most of the sealing gland, which further excludes contamination and aids in seal stability during a pressure spike event. High-modulus cross-linked elastomers or thermoplastics, such as polyurethane, may be used to aid in seal extrusion resistance, and also may enable resistance to large amounts of seal deformation for preventing sealing gland contamination from sealing lip deflection.

According to an aspect of the present disclosure, an annular seal that at least partially encompasses a longitudinal axis includes: a heel side configured to fit within an annular groove of a first component, the heel side having an axially extending flat heel surface in transverse cross-section when the seal is in an uncompressed state, the flat heel surface being configured to face a bottom of the annular groove; a sealing side that is opposite the heel side and is configured to seal against a second component, the sealing side having a concave portion that is configured to open toward and face the second component; and a leading side that is interposed between the sealing side and the heel side, and is configured to face toward upstream fluid when in use, the leading side having a flat leading surface in transverse cross-section when the seal is in an uncompressed state, wherein the flat leading surface is disposed in a plane that is perpendicular to the longitudinal axis.

According to another aspect of the present disclosure, an annular seal that at least partially encompasses a longitudinal axis includes: a heel side configured to fit within an annular groove of a first component; a sealing side that is opposite the heel side and is configured to fluidly seal against a second component, the sealing side having a concave portion that is configured to open toward and face the second component; and a radially protruding pedestal portion within the concave portion.

According to another aspect of the present disclosure, an assembly includes: the annular seal having one or more of the foregoing features alone or in any combination; a first component; and a second component; wherein the annular seal is sealingly interposed between the first component and the second component.

The following description and the annexed drawings set forth certain illustrative embodiments of the invention. These embodiments are indicative, however, of but a few of the various ways in which the principles of the invention may be employed. Other objects, advantages and novel features according to aspects of the invention will become apparent from the following detailed description when considered in conjunction with the drawings.

BRIEF DESCRIPTION OF THE DRAWINGS

The annexed drawings, which are not necessarily to scale, show various aspects of the invention.

FIG. 3 is a cross-sectional side view of the seal taken about the line 3-3 in FIG. 2.

FIG. 4 is an enlarged cross-sectional view of a portion of the seal taken from section 4-4 in FIG. 3.

FIG. 10 is a cross-sectional side view of the seal taken about the line 10-10 in FIG. 9.

FIG. 11 is an enlarged cross-sectional view of a portion of the seal taken from section 11-11 in FIG. 10.

FIG. 14 is a perspective view of another exemplary seal according to another embodiment of the present disclosure.

FIG. 15 is a cross-sectional side view of the seal taken about the line 15-15 in FIG. 14.

DETAILED DESCRIPTION

The principles and aspects of the present disclosure have particular application to seals for use in hydraulic fracturing pump assemblies, and thus will be described below chiefly in this context. It is understood, however, that the principles and aspects of this disclosure may be applicable to seals for other systems where it is desirable to exclude contaminants or other debris from entering the sealing gland, and also to enhance seal stability and extrusion resistance, such as during rapid system pressure pulsation events.

Figure 1:
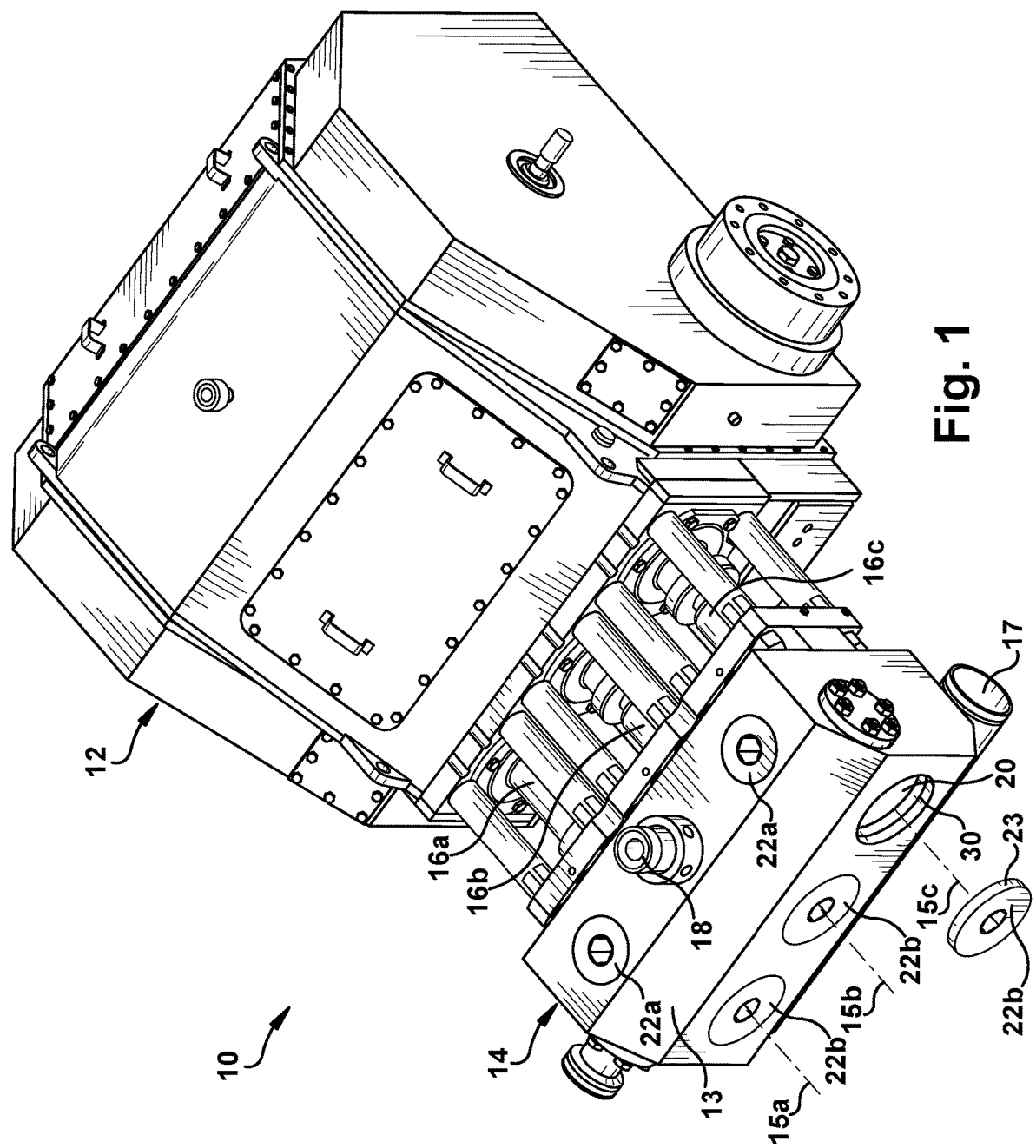
FIG. 1 is a perspective view of an exemplary pump assembly that utilizes an exemplary seal according to an embodiment of the present disclosure.

Referring to FIG. 1, an exemplary hydraulic fracturing pump assembly 10 that utilizes an exemplary annular seal 30 according to an embodiment of the present disclosure is shown. In the illustrated embodiment, the pump assembly 10 (also referred to as a "fracking pump" or "pump") is a reciprocating plunger pump assembly having a power end 12 and a fluid end 14 that operate together in a well-known manner, such as described in U.S. Application Publication No. 2016/0208797 ("U.S. 2016/0208797"), which is hereby incorporated herein by reference in its entirety.

Generally, as described in U.S. 2016/0208797, the fluid end 14 includes a pump housing 13 that contains valves, valve seats, plungers, seal packings, springs, retainers, and the like. The pump housing 16 has a suction valve in a suction bore, a discharge valve in a discharge bore, and a plunger in a plunger bore. In the illustrated embodiment, the pump assembly 10 is a triplex pump having three plunger cylinders or bores with centerlines 15a, 15b and 15c, each with a corresponding plunger 16a, 16b and 16c, movably disposed with respect thereto. It is understood that although the fracking pump 10 is shown as a triplex pump, the plunger pump assembly 10 may having any appropriate number of cylinders.

As described in U.S. 2016/0208797, for example, the power end 12 of the pump 10 is configured to convert rotation of a drive shaft to reciprocating motion of the plurality of plungers 16a, 16b and 16c. The reciprocating motion of the plungers, in association with the operation of valves within the fluid end 14, produces a pumping process due to the volume evolution within the fluid end. More particularly, in the suction stroke, the plunger retracts along the plunger bore and causes a quick decrease of the inner pressure. The suction valve is opened and the fluid is pumped from a source through a suction manifold 17 into an inner chamber of the housing 13 due to the pressure difference between the suction pipe and the inner chamber. In the forward stroke, the hydraulic pressure gradually increases until it is large enough to open the discharge valve and thus pump the compressed liquid out of the housing 13 through a discharge manifold 18.

Figure 8:
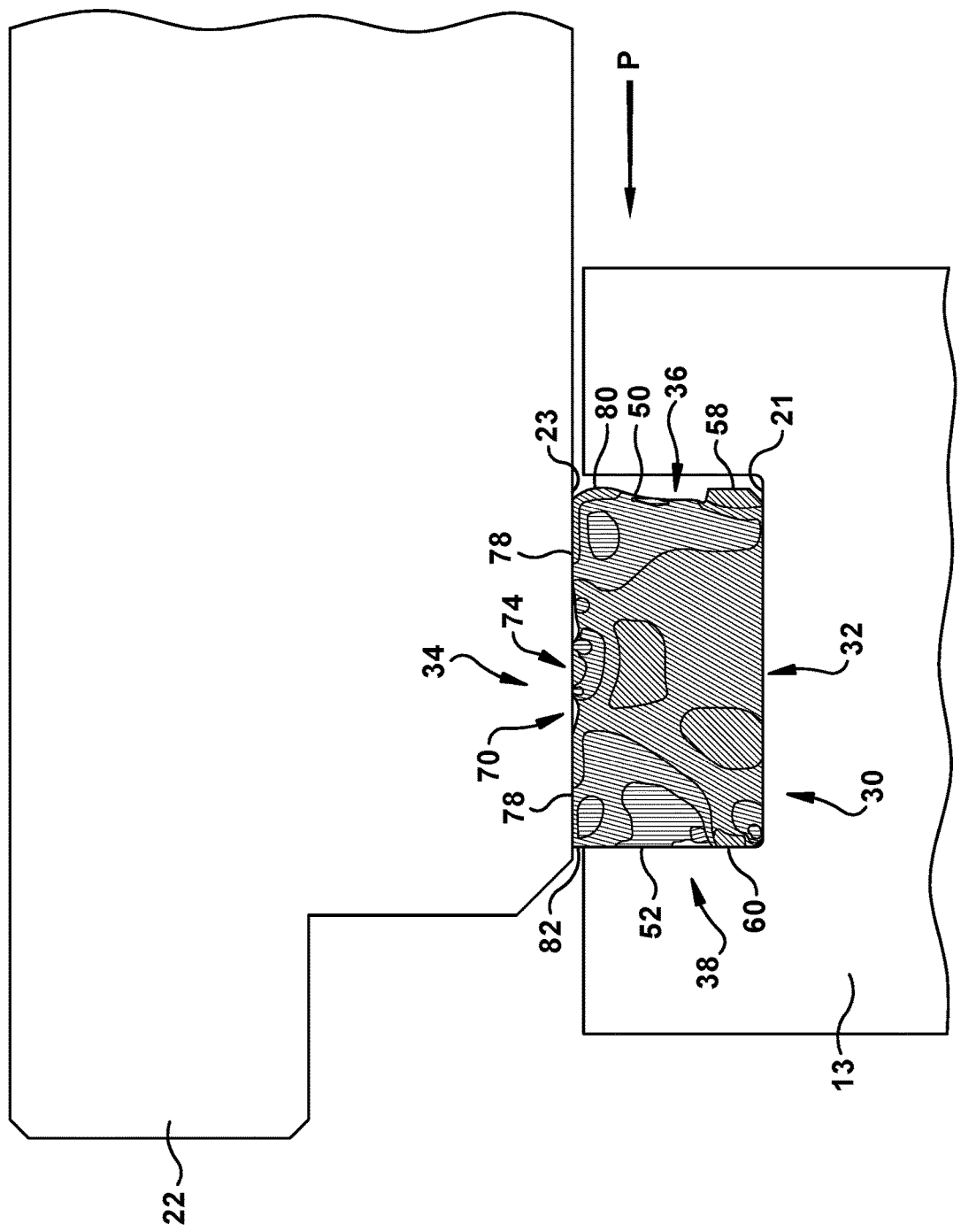
FIG. 8 is a cross-sectional side view of the assembly in an exemplary fully installed and in-use state.

To provide access to each of the discharge bore and the suction bore, the housing 13 includes one or more corresponding access bores having external ports 20 that are closed with corresponding discharge covers 22a and suction covers 22b (collectively referred to herein as covers 22). As described in further detail below, an exemplary annular seal 30 according to an embodiment of the present disclosure is interposed between the cover 22 and a portion of the housing 13 to provide suitable sealing functionality. For example, in exemplary embodiments, one side of the annular seal 30 is inserted into an annular groove 21 (e.g., sealing gland) in the housing 13, while the opposite side of the seal 30 is configured to sealingly engage a corresponding mating surface 23 of the cover 22 (as shown in FIG. 8, for example). In other embodiments, however, the sealing gland (e.g., annular groove) may be formed in the cover 22, such that the seal 30 is first inserted into the gland of the cover 22 and the sealing portion of the seal 30 then engages the housing 13 when the cover 22 is secured in position. As discussed in further detail below, the exemplary annular seal 30 is configured to exclude fracking debris from the entering the sealing gland containing the seal 30, and also is designed to enhance seal stability and extrusion resistance during rapid system pressure pulsation events that may occur during fracking operations.

Referring to FIGS. 2-8, the exemplary annular seal 30 of the exemplary fracking pump assembly 10 is shown in further detail. As shown, the annular seal 30 generally includes a heel side 32 configured to fit within an annular groove (e.g., gland) of a first component (e.g., housing 13), a sealing side 34 that is opposite the heel side 32 and is configured to seal against a second component (e.g., cover 22), a leading side 36 that is radially interposed between the sealing side 34 and the heel side 32, and is configured to face toward upstream fluid (e.g., from within the housing 13), and a trailing side 38 that is radially interposed between the sealing side 34 and the heel side 32, and which is configured to face away from the upstream fluid (e.g., toward the outside of the housing 13 in FIG. 1, for example).

Figure 2:
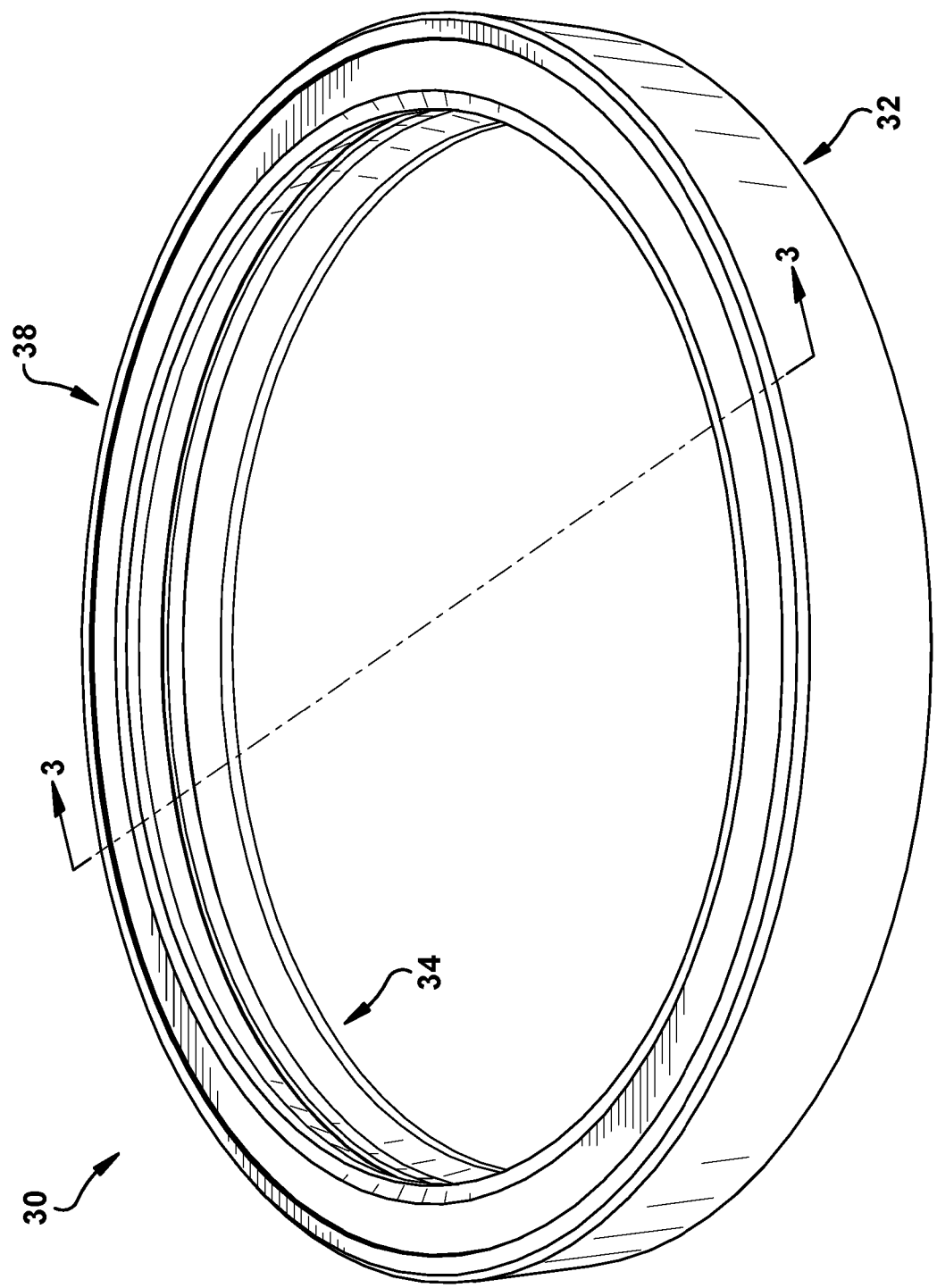
FIG. 2 is a perspective view of an exemplary seal according to an embodiment of the present disclosure.

Referring particularly to FIGS. 2-4, the annular seal 30 is shown in its uninstalled and uncompressed state. As shown, the seal 30 is configured to extend circumferentially within a first plane 40 to encompass a longitudinal axis 42 that is perpendicular to the first plane 40. In the illustrated embodiment, the seal 30 is a single continuous structure, although it is understood that the seal 30 could include a split, or may be segmented to facilitate installation where desirable for particular applications. Due to the harsh environmental conditions provided by the fracking pump assembly 10, however, it is desirable in exemplary embodiments to provide the seal 30 as a unitary structure to further restrict contaminants from entering the sealing gland, and to further restrict extrusion of the seal 30 from the gland.

Figure 9:
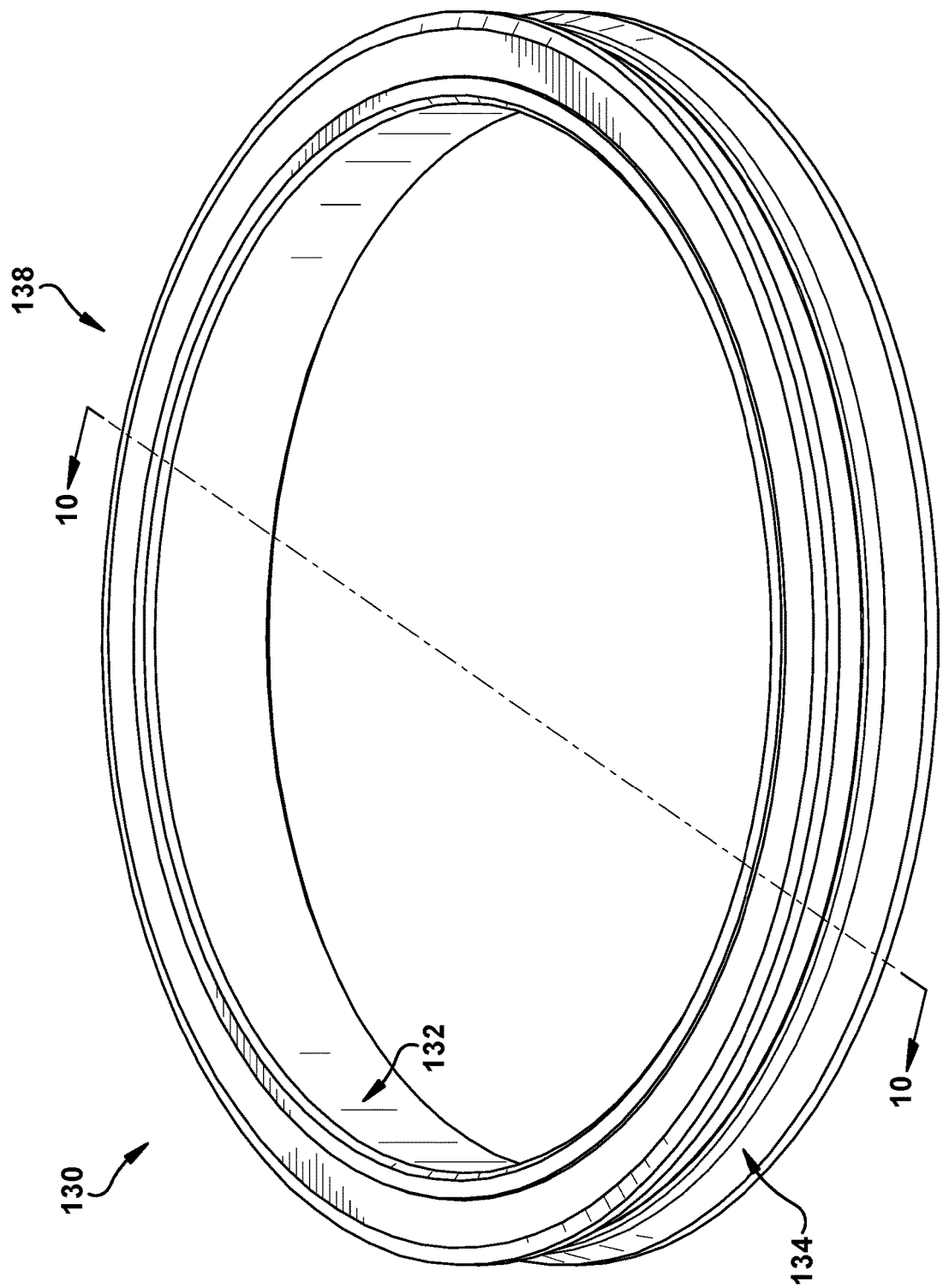
FIG. 9 is a perspective view of another exemplary seal according to an embodiment of the present disclosure.

Referring particularly to FIGS. 3 and 4, a transverse cross-sectional view of the seal 30 is shown, which is taken along a second plane that extends radially through the longitudinal axis 42 and is perpendicular to the first plane 40 (e.g., the second plane extends in the direction of line 3-3 in FIG. 2). In the illustrated embodiment, the sealing side 34 is at the radially inner side of the seal 30, and the heel side 32 is at the radially outer side of the seal 30. In such a configuration, the seal 30 may be used for insertion of the heel side 32 into an annular groove 21 in a radially inner bore of the housing 13, and the sealing side 34 sealingly engages a radially outer mating surface 23 of the cover 22 (as depicted in FIGS. 1 and 8, for example). It is understood, however, that the seal 30 may be configured with the sealing side 34 and the heel side 32 reversed, as shown in FIG. 9, for example.

In exemplary embodiments, the leading side 36 of the seal 30 has a flat leading surface 50 (in transverse cross-section) that is disposed in a plane 51 that is perpendicular to the longitudinal axis 42. As discussed in further detail below, such a flat surface 50 may enhance the exclusionary functionality of the seal 30 to restrict contaminates from entering the sealing gland when the seal 30 is installed and in use. More particularly, as shown in FIG. 8, for example, the flat leading surface 50 may be configured to maintain a nearly 90-degree angle with respect to the heel side 32 and/or the sealing side 34 as fluid pressure exerted on the seal increases and deforms the seal 30. As discussed below, such a configuration may enable the seal 30 to increase its sealing force against an opposed sealing surface as the system pressure increases. In addition, such a sharp sealing-lip lead-in surface of the seal 30 may be particularly useful in excluding contamination from entering the sealing gland, and may aid in seal stability during pressure spike events.

In exemplary embodiments, the top portion (e.g., leading side 36) of the seal 30 is a symmetrical mirror image of the bottom portion (e.g., trailing side 38) of the seal 30 about the first plane 40, which may further enhance the stability of the seal 30 under high-pressure pulsation events. Accordingly, similarly to the leading side 36, the trailing side 38 includes a flat trailing surface 52 (in transverse cross-section when uncompressed), which is disposed in a second plane 53 that is perpendicular to the longitudinal axis 42.

In exemplary embodiments, the leading side 36 and/or the trailing side 38 also may include corresponding leading and trailing shoulder portions 54, 56. As shown, the leading shoulder portion 54 extends axially beyond the plane 51 having the flat leading surface 50, and the trailing shoulder portion 56 extends axially beyond the second plane 53 having the flat trailing surface 52. The respective leading and trailing shoulder portions 54, 56 are disposed toward the heel side 32 of the seal, which axially enlarges the heel side 32 to facilitate installation and securement of the seal 30 within the sealing gland (as shown in FIGS. 5-8, for example, and described further below). In exemplary embodiments, the leading and trailing shoulder portions 54, 56 each has a flat surface 58, 60 at their respective axial ends, which may further facilitate securement of the seal 30 in the annular groove. In addition, as discussed in further detail below, the shoulder portions 54, 56 may be configured to promote filling the axial length of the sealing gland for enhancing the exclusion of contamination, and to aid in seal stability during a pressure spike event when the seal 30 is installed and in use.

As shown in FIG. 4, the heel side 32 may have an axially extending flat heel surface 62 in transverse cross-section when the seal is in the uncompressed state, and this surface 62 extends circumferentially about the longitudinal axis (as shown in FIG. 2). As shown, the flat heel surface 62 is parallel to the longitudinal axis 42, and is perpendicular to the first plane 40. As discussed in further detail below, the relatively large flat heel surface 62 may further facilitate filling of the sealing gland with the seal 30 during use. The seal 30 also includes a leading chamfered corner surface 64 that connects the heel side 32 with the leading shoulder portion 54 of the leading side 36, and a trailing chamfered corner surface 66 that connects the heel side 32 with the trailing shoulder portion 56 of the trailing side 38. These respective chamfered corner surfaces 64, 66 may facilitate insertion of the seal into the gland groove, and also may be configured to allow the seal 30 to deform when exposed to fluid pressure to fill the corner(s) of the groove 21 (as shown in FIG. 8, for example, which is described in further detail below).

In exemplary embodiments, the sealing side 34 has a concave portion 70 that is configured to open toward and face the opposed second component (e.g., cover 22 as shown in FIGS. 5-8, for example). In the illustrated embodiment, the concave portion 70 includes a pair of flat inclined surfaces 72 that taper radially outwardly as they extend toward the middle of the seal 30. As described in further detail below, the concave portion 70 is configured to radially deform when in use to provide enhanced sealing engagement with the corresponding mating face 23 of the second component 22 (as shown in FIG. 8, for example). In addition, such deformation of the concave surface 70 also may enhance the ability of the seal 30 to axially deform to increase the amount of gland fill (also as shown in FIG. 8, for example).

Figure 7:
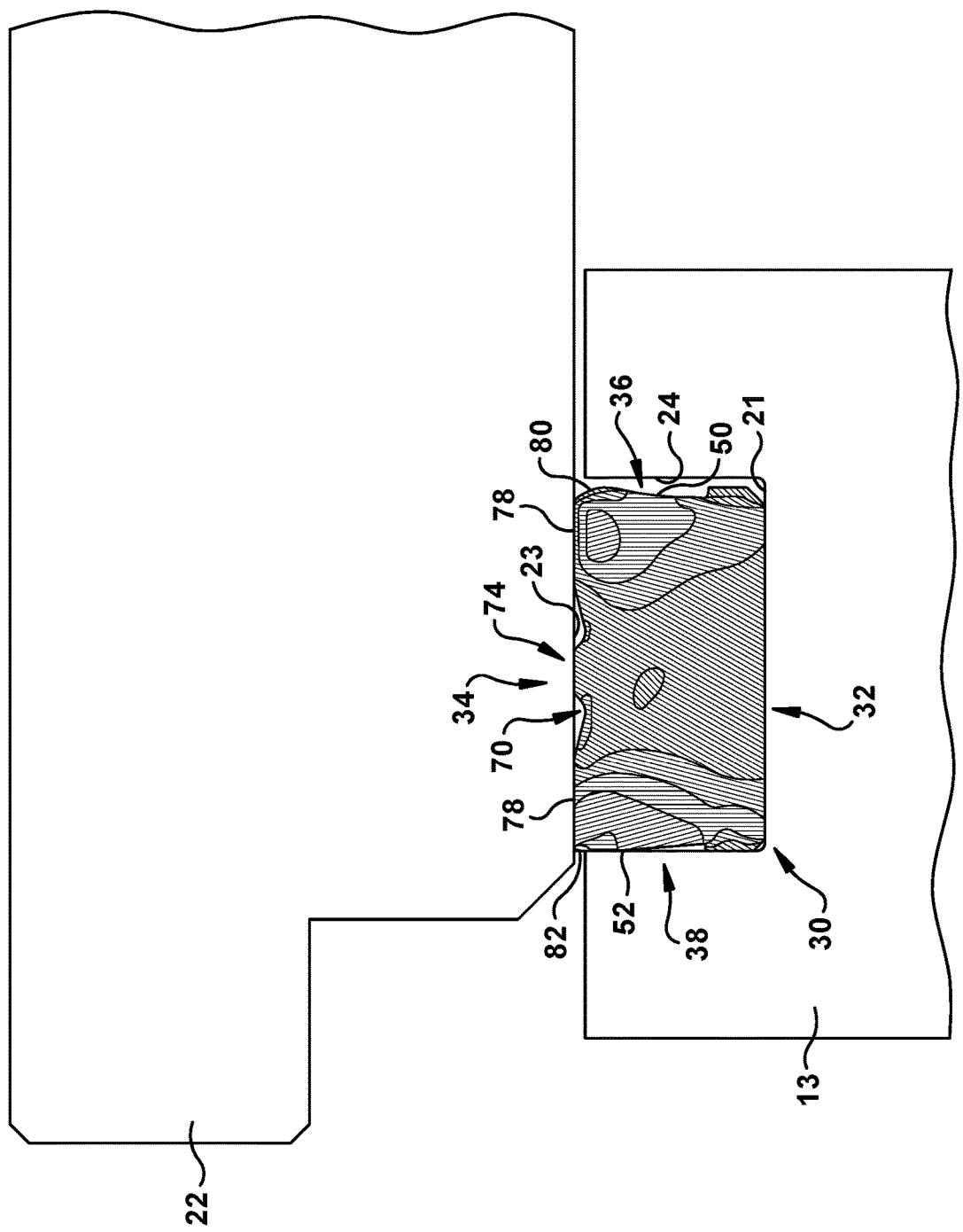
FIG. 7 is a cross-sectional side view of the assembly when the second component is further advanced relative to the first component to further engage the seal.

In exemplary embodiments, the concave portion 70 includes a radially protruding pedestal portion 74 that is configured to stabilize the concave surfaces 72 during deformation when the seal 30 in use. In the illustrated embodiment, the pedestal portion 74 is at the middle of the concave portion 70, and has an axially extending flat pedestal surface 76 (in transverse cross-section) that is configured to engage the opposing mating surface 23 of the second component (as shown in FIGS. 7 and 8, for example). Also as shown in the illustrated embodiment, the sealing side 34 includes axially spaced apart flat sealing surfaces 78 (in transverse cross-section) that are disposed on axially opposite sides of the concave portion 70. Such axially extending flat sealing surfaces 78 enhance the sealing functionality of the seal 30 against the second component when in use (as shown in FIG. 8, for example). In addition, such a configuration enables the flat leading surface 50 of the leading side 36 to be oriented perpendicularly with respect to the orientation of the flat sealing surface(s) 78 of the sealing side 34, which may further enhance the exclusionary aspect of the seal, as discussed in further detail below.

As shown in the illustrated embodiment, the seal 30 also includes a leading chamfered corner surface 80 connecting the sealing side 34 with the leading side 36, and a trailing chamfered corner surface 82 connecting the sealing side 34 with the trailing side 38. As discussed below, these chamfered corner surface(s) 80, 82 are configured to facilitate slidable insertion of the second component (e.g., 22) relative to the first component (e.g., 13) (as shown in FIGS. 5-8, for example). In addition, the leading chamfered corner surface 80 and/or the trailing corner surface 82 may be configured to deform when the seal 30 is in use to further enhance the exclusionary aspect of the seal 30.

Figure 5:
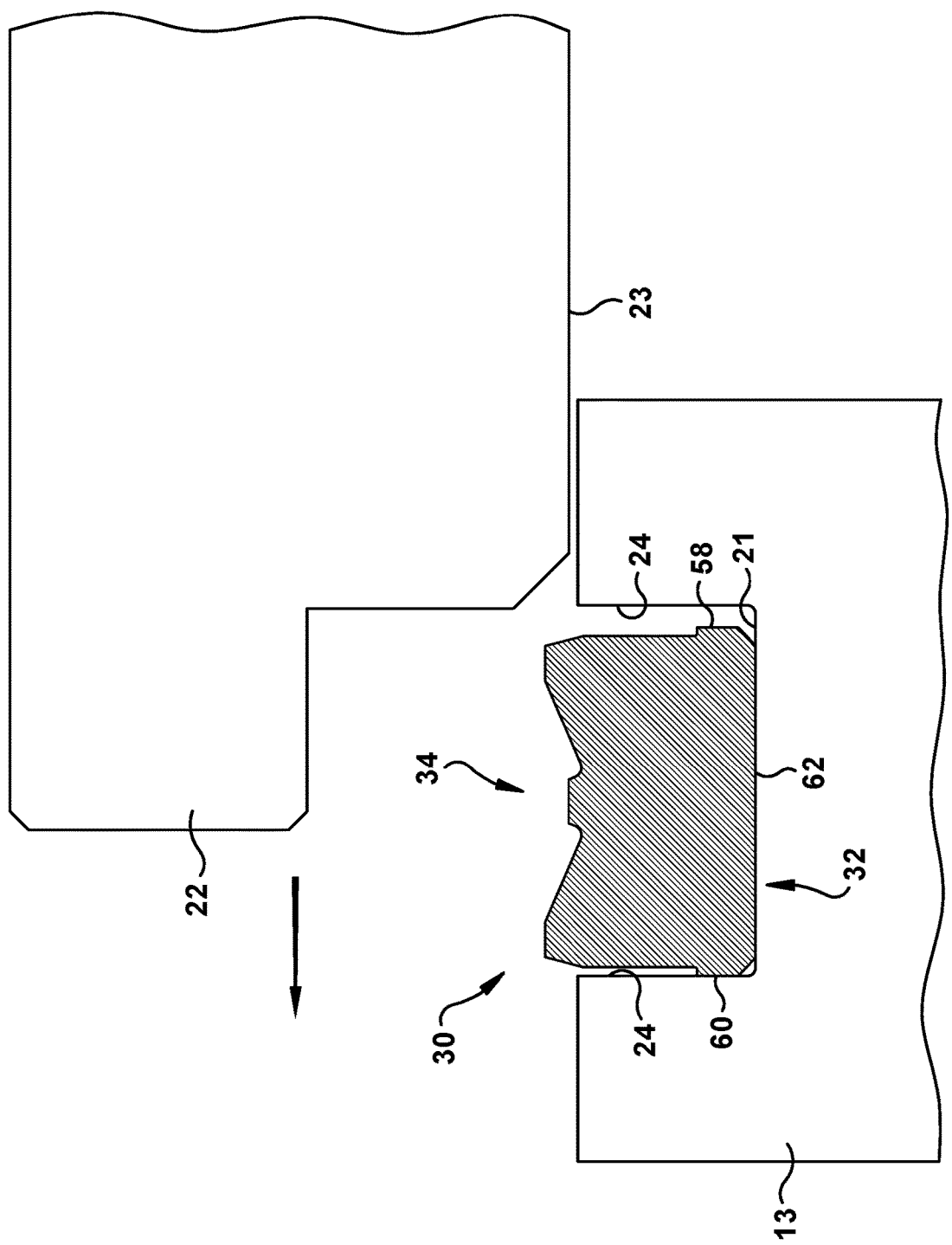
FIG. 5 is a cross-sectional side view of an exemplary assembly showing the seal of FIG. 2 installed in a first component prior to engagement with a second component.

Referring now to FIGS. 5-8, the installation and use of the exemplary seal 30 is shown. In FIGS. 5-8, the various hatching patterns are used to illustrate changes in pressure distribution within the seal 30 during installation and use. FIG. 5 shows the seal inserted into the annular groove 21 (e.g., gland), in which the flat heel surface 62 of the heel side 32 faces and engages the bottom of the groove 21. In the installed state, one or more respective surface(s) 58, 60 of the leading and trailing shoulder portion(s) 54, 56 may engage the lateral side wall(s) 24 of the groove. In some embodiments, both shoulder portions 54, 56 may engage the side walls 24 of the groove, which may provide a relatively tight fit within the groove to secure the seal 30 in place. As discussed above, in the illustrated embodiment the heel side 32 is at a radially outer side of the seal 30 and fits within the annular groove 21 of the first component (e.g., housing 13), and the sealing side 34 is at the radially inner side of the seal 30 to sealingly engage with the opposing second component (e.g., cover 22).

Figure 6:
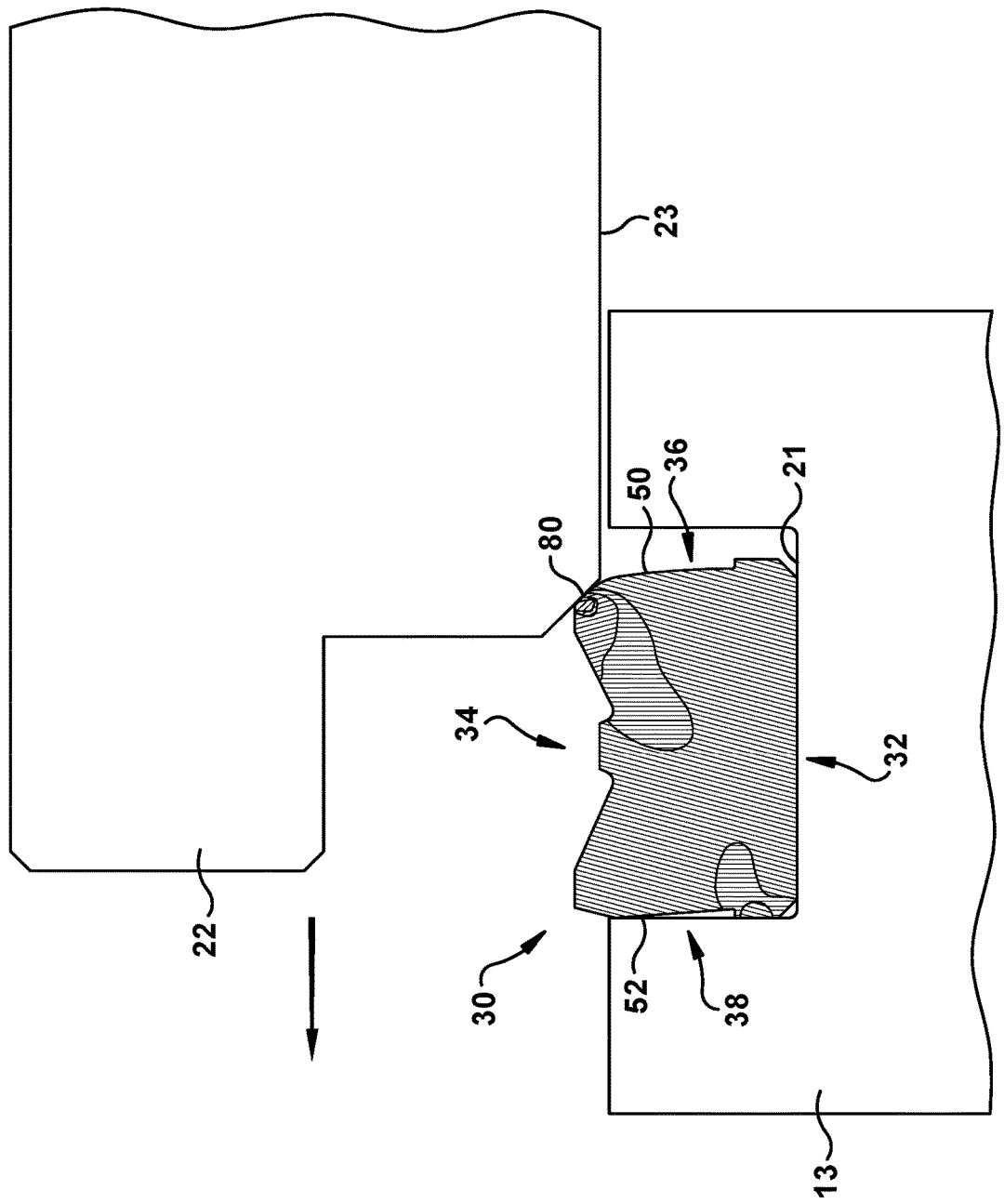
FIG. 6 is a cross-sectional side view of the assembly when the second component initially engages the seal.

FIG. 6 shows the initial engagement of the second component 22 with the seal 30 as the second component 22 is advanced relative to the first component 13 (e.g., as the cover 22 is placed in position on the housing 13, as depicted in FIG. 1, for example). As shown in the illustrated embodiment, the trailing chamfered surface 82 at the sealing side 34 facilitates insertion by allowing deformation of the seal 30 without causing the seal to be extruded from the annular groove. FIG. 7 shows further advancement of the second component 22 with respect to the first component 13, such that the flat sealing surfaces 78 and pedestal portion 74 sealingly engage with the corresponding mating surface 23 of the second component 22. As shown in this state, the seal 30 has deformed when compressed such that the concave portion 70 grows radially, and the seal 30 has also grown axially to fill a greater portion of the annular groove 21. In exemplary embodiments, the seal 30 may essentially fill the entire groove, for example, may fill greater than 75-90%, or greater than 90-95%, or more, of the groove prior to exposure to fluid pressure and operating temperatures. More particularly, in exemplary embodiments, the seal 30 is designed to fill 95-100% of the available gland space by taking into account thermal expansion and fluid swell due to exposure while in use.

FIG. 8 shows the exemplary seal 30 in a fully installed and in-use state when exposed to upstream fluid pressure P from within the housing 13 of the fracking pump assembly 10. As discussed above, the exemplary seal 30 is configured with a specific geometry that provides an exclusionary sealing lip when in use for preventing contamination from entering the sealing gland. For example, as shown in the illustrated embodiment of FIG. 8, the annular seal 30 is self-energized and configured to deform in a compressed state when installed with respect to the first and the second components 13, 22, and when exposed to fluid pressure P, to provide such an exclusionary sealing lip. For example, as shown in the illustrated state, the flat leading surface 50 at the sealing side 34 is configured to maintain a nearly 90-degree angle relative to the flat heel surface 62, such as in the range of 80-100 degrees, even when the seal 30 is deformed due to the exposure to the fluid pressure P during the in-use conditions. In this manner, such a sealing lip portion of the seal 30 that faces the upstream fluid debris poses and exclusionary wall of the seal that prevents contaminants from passing by the seal and/or entering the sealing gland. In addition, such a configuration may enable the seal 30 to increase its sealing force against the opposing mating surface 23 as the system pressure increases, which also may enhance seal stability during pressure spike events.

The seal 30 also is configured to deform when in use such that the concave portion 70 of the seal 30 radially expands to compress against the second component 22. For example, when the seal 30 is in use, the flat sealing lip surfaces 78 on the sealing side 34 are compressed against the opposing mating surface 23 of the second component 22 to enhance sealability and stability of the seal 30. Such a feature of the flat sealing lip surfaces 78 may enhance sealability on varied (e.g., non-planar or non-flat) surfaces, and also may prevent localized metal wear surrounding the sealing lip. The pedestal portion 74 of the seal 30 also enhances stability of the seal 30 during deformation by engaging the opposing mating surface 23 of the second component 22, and also by restricting material flow into the middle area of the concave portion 70.

Also as discussed above, the exemplary seal 30 has a geometry that is designed to fill all or most of the sealing gland to further exclude contamination and aid in seal stability during pressure pulsation events. More particularly, the configuration of the seal 30 enables control of gland fill next to the exclusion area of the seal (the area of the seal exposed to the upstream fluid pressure P that excludes debris), and also controls gland fill next to the extrusion gap (the downstream area opposite fluid pressure P). For example, as shown in FIG. 8, the annular seal 30 is configured to deform when installed and exposed to fluid pressure, such that the seal 30 axially expands to fill all or most of an axial extent of the annular groove 21 (e.g., the region between sidewalls 24). Also as shown, such axial expansion of the seal 30 causes the flat leading surface 50 of the seal to axially expand such that the flat leading surface 50 lies essentially in the same plane as the axial end surface 58 of the leading shoulder portion. In this manner, when installed and in use, the exemplary seal 30 forms an essentially flat planar surface at its leading edge to maximize the exclusion of debris by the seal.

In exemplary embodiments, the seal 30 is made of high-modulus cross-linked elastomers or thermoplastics, such as polyurethane. Such materials may be used to aid in seal extrusion resistance, and resist large amounts of seal deformation to aid in preventing sealing gland contamination by sealing lip deflection. Any other suitable material may be used for the seal, as would be understood by those having ordinary skill in the art.

Figure 12:
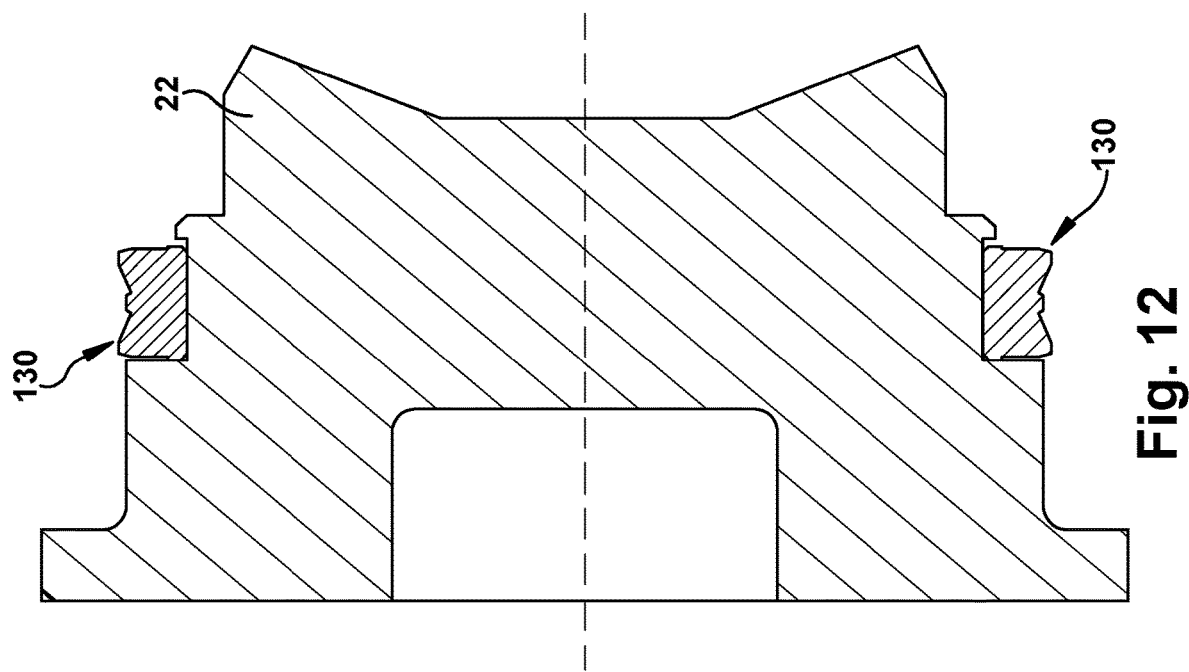
FIG. 12 is a cross-sectional side view of an exemplary assembly showing the seal of FIG. 9 installed on a second component, such as a pump cover, prior to engagement with a first component, such as a pump housing.
Figure 13:
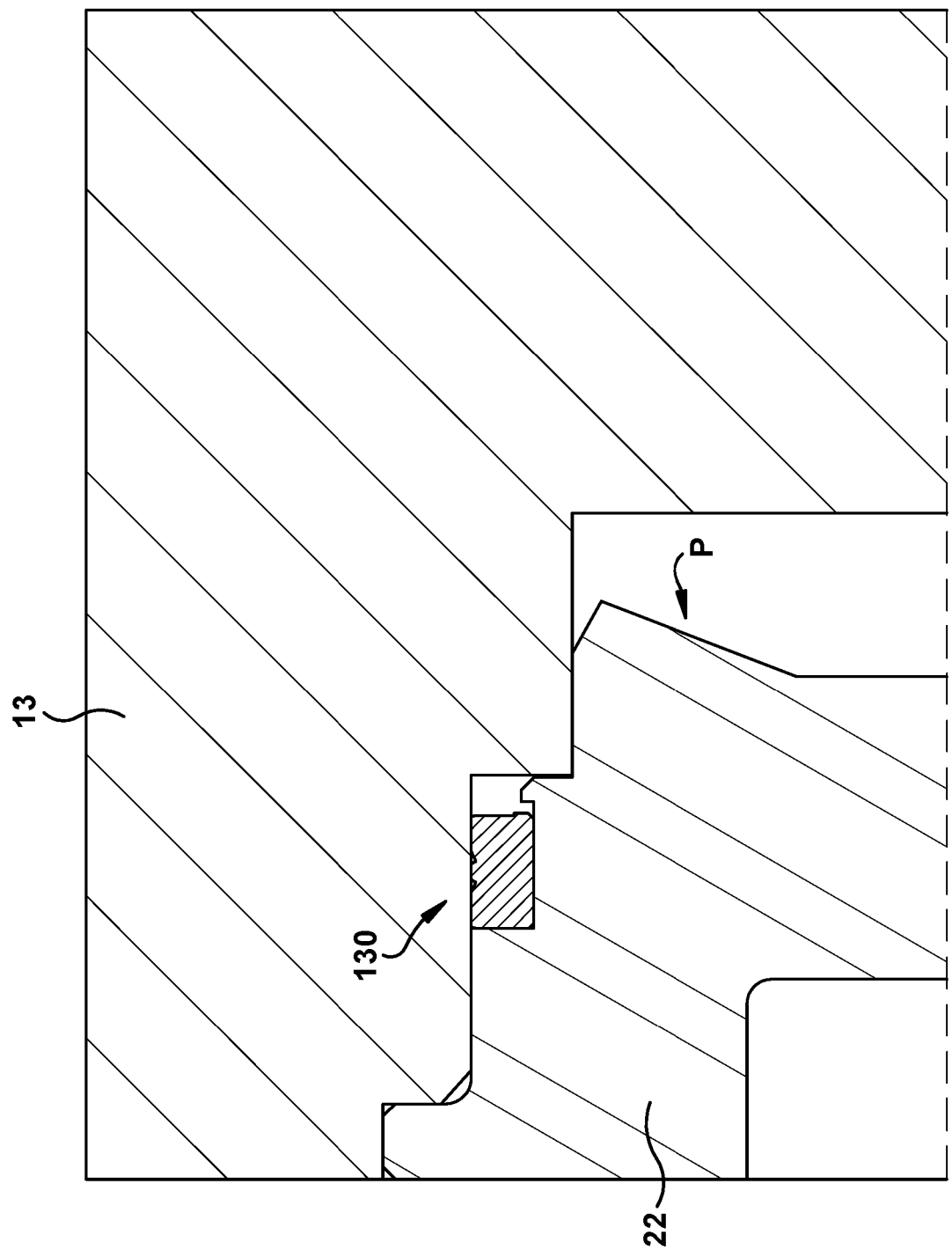
FIG. 13 is a cross-sectional side view showing the exemplary assembly of FIG. 12 in an exemplary fully installed state.

Turning now to FIGS. 9-13, another exemplary embodiment of an annular seal 130 is shown. The seal 130 is substantially comparable to the above-referenced seal 30, except that the sealing side 134 is at the radially outer side and the heel side 132 is at the radially inner side. In this manner, when used in the exemplary fracking pump 10 of FIG. 1, the heel side 132 of the seal 130 would be disposed in an annular groove of the cover 22 (as shown in FIG. 12, for example) and the sealing side 134 would sealingly engage against a corresponding mating surface of the housing 13 (as shown in FIG. 13, for example. Because the seals 30, 130 are substantially comparable, the same reference numerals but indexed by 100 are used in FIGS. 9-13 to denote structures in the seal 130 that correspond to similar structures in the seals 30. In addition, the foregoing description of the seal 30 is equally applicable to the seal 130.

Turning to FIGS. 14 and 15, another exemplary embodiment of an annular seal 230 is shown. The seal 230 is substantially comparable to the above-referenced seal 30, and consequently the same reference numerals but indexed by 200 are used to denote structures corresponding to similar structures in the seals 30, 230. In addition, the foregoing description of the seal 30 is equally applicable to the seal 230, except as noted below. Moreover, aspects of the seals 30, 230 may be substituted for one another or used in conjunction with one another where applicable.

As shown in the illustrated embodiment, the seal 230 has the sealing side 234 at the radially outer side of the seal 230, and the heel side 232 is at the radially inner side of the seal 230; although it is understood that these sides could be reversed. In addition, the leading side 236 of the seal 230 has a leading recessed portion 286 that is adjacent to the leading shoulder portion 258. As shown, the leading recessed portion 286 is axially recessed relative to the plane having the flat leading surface 250. Similarly to the seal 30, the trailing side 238 of the seal 230 is a symmetrical mirror image of the leading side 236, and thus the trailing side 238 has a trailing recessed portion 288 adjacent to the trailing shoulder portion 260. Similarly to the seal 30, when the seal 230 is in the installed and compressed state in use, the geometry of the seal 230 is configured to deform to control gland fill by filling all or most of the sealing gland to exclude contamination, and also is configured to deform to aid in sealability and stability of the seal 230 during pressure pulsation events. In this manner, the recessed portions 286, 288 of the seal 230 may axially and radially expand when in use, such that the seal 230 forms an essentially flat planar surface at its leading side 236 (similarly to that shown in FIG. 8) to maximize the exclusion of debris by the seal.

Such a configuration of the seal 230 may help to accommodate large tolerances in the gland width (e.g., between surfaces 24) for particular applications. For example, the recessed portions 286, 288 may be configured as over-flow areas to control gland fill should the gland width be too small. If the gland width is too wide, then surfaces 258, 260 add stability and help prevent too much rocking and sliding movement in the gland during pressure pulses.

An annular seal, such as for use in a fracking pump, that is designed to exclude debris from entering the sealing gland, and is designed to enhance seal stability and extrusion resistance during high-pressure pulsation events has been described herein. The annular seal includes a heel side configured to fit within an annular groove of a first component, a sealing side that is opposite the heel side and is configured to seal against a second component, and opposite leading and trailing sides that are radially interposed between the sealing side and the heel side. The heel side may have a flat heel surface in transverse cross-section. The sealing side may have a concave portion that is configured to open toward and face the second component, and may have a radially protruding pedestal portion within the concave portion. The leading side is configured to face toward upstream fluid, and may have a flat leading surface in transverse cross-section that is oriented perpendicularly to a longitudinal axis of the seal.

According to an aspect of the present disclosure, an annular seal that at least partially encompasses a longitudinal axis includes: a heel side configured to fit within an annular groove of a first component, the heel side having an axially extending flat heel surface in transverse cross-section when the seal is in an uncompressed state, the flat heel surface being configured to face a bottom of the annular groove; a sealing side that is opposite the heel side and is configured to seal against a second component, the sealing side having a concave portion that is configured to open toward and face the second component; and a leading side that is interposed between the sealing side and the heel side, and is configured to face toward upstream fluid when in use, the leading side having a flat leading surface in transverse cross-section when the seal is in an uncompressed state, wherein the flat leading surface is disposed in a plane that is perpendicular to the longitudinal axis.

Embodiments according to the present disclosure may include one or more of the following additional features separately or in any combination.

In some embodiments, the concave portion has a radially protruding pedestal portion.

In some embodiments, the pedestal portion is at the middle of the concave portion.

In some embodiments, the pedestal portion has an axially extending flat pedestal surface in transverse cross-section when the seal is in the uncompressed state.

In some embodiments, the sealing side includes axially spaced apart flat sealing surfaces in transverse cross-section when the seal is in an uncompressed state, the flat sealing surfaces being disposed on opposite sides of the concave portion.

In some embodiments, the flat leading surface of the leading side is oriented perpendicularly with respect to the orientation of the flat sealing surfaces of the sealing side.

In some embodiments, the leading side has a leading shoulder portion that extends axially beyond the plane having the flat leading surface, the leading shoulder portion being disposed toward the heel side of the seal.

In some embodiments, the seal includes a trailing side opposite the leading side, the trailing side being interposed between the sealing side and the heel side, and being configured to face away from the upstream fluid, the trailing side having a flat trailing surface in transverse cross-section when the seal is in an uncompressed state, wherein the flat trailing surface is disposed in a second plane that is perpendicular to the longitudinal axis.

In some embodiments, the trailing side has a trailing shoulder portion that extends axially beyond the second plane having the flat trailing surface, the trailing shoulder portion being disposed toward the heel side of the seal.

In some embodiments, the leading side has a leading recessed portion adjacent to the leading shoulder portion, the leading recessed portion being axially recessed relative to the plane having the flat leading surface.

In some embodiments, the trailing side has a trailing recessed portion adjacent to the trailing shoulder portion, the trailing recessed portion being axially recessed relative to the second plane having the flat trailing surface.

In some embodiments, the heel side is on a radially outer side of the seal, and the sealing side is on a radially inner side of the seal.

In some embodiments, the heel side is on a radially inner side of the seal, and the sealing side is on a radially outer side of the seal.

In some embodiments, the seal includes a first leading chamfered corner connecting the sealing side with the leading side.

In some embodiments, the seal includes a second leading chamfered corner connecting the heel side with the leading shoulder portion of the leading side.

In some embodiments, the seal includes a trailing chamfered corner connecting the sealing side with the trailing side.

In some embodiments, the seal includes a second trailing chamfered corner connecting the heel side with the trailing shoulder portion of the trailing side.

According to another aspect of the present disclosure, an assembly includes: the annular seal having one or more of the foregoing features alone or in any combination; a first component; and a second component; wherein the annular seal is sealingly interposed between the first component and the second component.

In some embodiments, the annular seal is configured to deform into a compressed state when installed with respect to the first component and the second component and when exposed to fluid pressure, such that, in the compressed state, the concave portion radially expands to interface with the second component, and such that the flat leading surface of the leading side is at a nearly 90-degree angle relative to the flat heel surface of the heel side.

In some embodiments, the annular seal is configured to deform into a compressed state when installed with respect to the first component and the second component and when exposed to fluid pressure, such that the seal axially expands to fill an axial extent of the annular groove.

In some embodiments, the first component is a cover, and the second component is a housing that receives the cover, or vice versa.

In some embodiments, the assembly is part of a fracking system, the fracking system further comprising: a fracking pump for pumping fracking fluid from a source, in which the fracking pump provides a fracking fluid stream downstream of the source; wherein the annular seal of the assembly is at least partially disposed in a gap between the first component and the second component to seal the gap against the fracking fluid stream.

According to another aspect of the present disclosure, an annular seal that at least partially encompasses a longitudinal axis includes: a heel side configured to fit within an annular groove of a first component; a sealing side that is opposite the heel side and is configured to fluidly seal against a second component, the sealing side having a concave portion that is configured to open toward and face the second component; and a radially protruding pedestal portion within the concave portion.

In the discussion above and to follow, the terms "upper", "lower", "top," "bottom," "end," "inner," "left," "right," "above," "below," "horizontal," "vertical," etc. should be understood as referring to an arbitrary frame of reference, rather than to the ordinary gravitational frame of reference. This is done realizing that these seals can be mounted on the top, bottom, or sides of other components, or can be provided in various other positions.

Although the invention has been shown and described with respect to a certain embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. An annular seal that at least partially encompasses a longitudinal axis, the annular seal comprising:
   a heel side configured to fit within an annular groove of a first component, the heel side having an axially extending flat heel surface in transverse cross-section when the annular seal is in an uncompressed state, the flat heel surface being configured to face a bottom of the annular groove;
   a sealing side that is opposite the heel side and is configured to seal against a second component, the sealing side having a concave portion that is configured to open toward and face the second component; and
   a leading side that is interposed between the sealing side and the heel side, and is configured to face toward upstream fluid when in use, the leading side having a flat leading surface in transverse cross-section when the annular seal is in an uncompressed state, wherein the flat leading surface is disposed in a plane that is perpendicular to the longitudinal axis
   wherein the annular seal is a self-energized annular seal,
   wherein the annular seal is configured to deform into a compressed state when installed with respect to the first component and the second component and when exposed to fluid pressure, such that, in the compressed state, an entire inner surface of the concave portion radially expands to interface with the second component, and such that the flat leading surface of the leading side is essentially perpendicular relative to the flat heel surface of the heel side.

2. The annular seal according to claim 1,
   wherein the concave portion has a radially protruding pedestal portion,
   wherein the pedestal portion is at the middle of the concave portion,
   wherein the pedestal portion has an axially extending flat pedestal surface in transverse cross-section when the annular seal is in the uncompressed state.

3. The annular seal according to claim 1, wherein the sealing side includes axially spaced apart flat sealing surfaces in transverse cross-section when the annular seal is in an uncompressed state, the flat sealing surfaces being disposed on opposite sides of the concave portion, and wherein the flat leading surface of the leading side is oriented perpendicularly with respect to the orientation of the flat sealing surfaces of the sealing side.

4. The annular seal according to claim 1,
wherein the leading side has a leading shoulder portion that extends axially beyond the plane having the flat leading surface, the leading shoulder portion being disposed toward the heel side of the annular seal,
wherein the annular seal includes a trailing side opposite the leading side, the trailing side being interposed between the sealing side and the heel side, and being configured to face away from the upstream fluid, the trailing side having a flat trailing surface in transverse cross-section when the annular seal is in an uncompressed state, wherein the flat trailing surface is disposed in a second plane that is perpendicular to the longitudinal axis, and
wherein the trailing side has a trailing shoulder portion that extends axially beyond the second plane having the flat trailing surface, the trailing shoulder portion being disposed toward the heel side of the annular seal.

5. The annular seal according to claim 4,
wherein the leading side has a leading recessed portion adjacent to the leading shoulder portion, the leading recessed portion being axially recessed relative to the plane having the flat leading surface,
wherein the trailing side has a trailing recessed portion adjacent to the trailing shoulder portion, the trailing recessed portion being axially recessed relative to the second plane having the flat trailing surface.

6. The annular seal according to claim 4,
wherein the annular seal includes a second leading chamfered corner surface connecting the heel side with the leading shoulder portion of the leading side, and
wherein the annular seal includes a second trailing chamfered corner surface connecting the heel side with the trailing shoulder portion of the trailing side.

7. The annular seal according to claim 1,
wherein the heel side is on a radially outer side of the annular seal, and the sealing side is on a radially inner side of the annular seal; or
wherein the heel side is on a radially inner side of the annular seal, and the sealing side is on a radially outer side of the annular seal.

8. The annular seal according to claim 1,
wherein the annular seal includes a leading chamfered corner surface connecting the sealing side with the leading side, and
wherein the annular seal includes a trailing chamfered corner surface connecting the sealing side with the trailing side.

9. An assembly comprising:
the annular seal according to claim 1;
the first component; and
the second component;
wherein the annular seal is sealingly interposed between the first component and the second component.

10. The assembly according to claim 9, wherein the annular seal is configured to deform into a compressed state when installed with respect to the first component and the second component and when exposed to fluid pressure, such that the seal axially expands to fill an axial extent of the annular groove.

11. The assembly according to claim 9, wherein the first component is a cover, and the second component is a housing that receives the cover, or vice versa, and wherein the cover and the housing are fixed relative to each other.

12. The assembly according to claim 11, wherein the assembly is part of a fracking system, the fracking system further comprising: a fracking pump for pumping fracking fluid from a source, in which the fracking pump provides a fracking fluid stream downstream of the source; wherein the annular seal of the assembly is at least partially disposed in a gap between the first component and the second component to seal the gap against the fracking fluid stream.

13. The annular seal according to claim 1, wherein the annular seal is an elastomeric annular seal.

14. The annular seal according to claim 1, wherein the annular seal has only a single concave portion on the sealing side, the single concave portion having only two inclined surfaces in transverse cross-section, the two inclined surfaces including a first continuously inclined surface that extends radially away from the sealing side toward the heel side and axially away from the leading side toward a trailing side of the annular seal, and a second continuously inclined surface that extends radially away from the sealing side toward the heel side and axially away from the trailing side toward the leading side of the annular seal.

15. The annular seal according to claim 1, wherein the axially extending flat heel surface extends continuously between the leading side and a trailing side of the annular seal and constitutes an entirety of the heel side of the annular seal.

16. The assembly according to claim 1, wherein the annular seal is a static self-energized elastomeric annular seal.

17. The assembly according to claim 16,
wherein, in transverse cross-section when in the uncompressed state, the annular seal includes a leading chamfered corner surface connecting the sealing side with the flat leading surface of the leading side, and
wherein, the leading chamfered corner surface is configured to deform when in the compressed state to form a flat surface that is essentially co-planar with the flat leading surface of the leading side.

18. The assembly according to claim 16, wherein the concave portion is configured to radially expand in the compressed state such that a majority of the surfaces forming the concave portion interface with the second component.

19. An annular seal that at least partially encompasses a longitudinal axis, the annular seal comprising:
a heel side configured to fit within an annular groove of a first component;
a sealing side that is opposite the heel side and is configured to fluidly seal against a second component, the sealing side having a concave portion that is configured to open toward and face the second component;
a leading side that is interposed between the sealing side and the heel side;
a trailing side opposite the leading side, the trailing side being interposed between the sealing side and the heel side;
a leading chamfered corner surface connecting the sealing side with the leading side; and
a trailing chamfered corner surface connecting the sealing side with the trailing side;
wherein:
the annular seal is a static self-energized elastomeric annular seal;

the leading side has a flat leading surface in transverse cross-section, wherein the flat leading surface is disposed in a first plane that is perpendicular to the longitudinal axis;

the trailing side has a flat trailing surface in transverse cross-section, wherein the flat trailing surface is disposed in a second plane that is perpendicular to the longitudinal axis and parallel to the first plane;

the annular seal has only a single concave portion on the sealing side, the single concave portion having only two inclined surfaces in transverse cross-section, the two inclined surfaces including a first continuously inclined surface that extends radially away from the sealing side toward the heel side and axially away from the leading side toward a trailing side of the annular seal, and a second continuously inclined surface that extends radially away from the sealing side toward the heel side and axially away from the trailing side toward the leading side of the annular seal; and the axially extending flat heel surface extends continuously between the leading side and the trailing side of the annular seal and constitutes an entirety of the heel side of the annular seal.

20. An annular seal that at least partially encompasses a longitudinal axis, the annular seal comprising:

a heel side configured to fit within an annular groove of a first component, the heel side having an axially extending flat heel surface in transverse cross-section when the annular seal is in an uncompressed state, the flat heel surface being configured to face a bottom of the annular groove;

a sealing side that is opposite the heel side and is configured to seal against a second component, the sealing side having only a single concave portion that is configured to open toward and face the second component;

a leading side that is interposed between the sealing side and the heel side, and is configured to face toward upstream fluid when in use, the leading side having a flat leading surface in transverse cross-section when the annular seal is in an uncompressed state, wherein the flat leading surface is disposed in a plane that is perpendicular to the longitudinal axis;

wherein the annular seal is a self-energized annular seal;

wherein the concave portion has a radially protruding pedestal portion, wherein the pedestal portion is at the middle of the concave portion, and wherein the pedestal portion has an axially extending flat pedestal surface in transverse cross-section when the annular seal is in the uncompressed state.

* * * * *